United States Patent [19]

Stĕphenne et al.

[11] 3,878,465

[45] Apr. 15, 1975

[54] INSTANTANEOUS ADAPTATIVE DELTA MODULATION SYSTEM

[75] Inventors: Hubert Stĕphenne, Rock Forest, Quebec; Pierre A. Deschênes; Françoise Busigny, both of Sherbrooke, Quebec, all of Canada

[73] Assignee: Universiste de Sheerbrooke, Sherbrooke, Quebec, Canada

[22] Filed: Dec. 15, 1972

[21] Appl. No.: 315,356

[52] U.S. Cl. .............................. 325/38 B; 332/11 D

[51] Int. Cl. .............................. H03k 13/22

[58] Field of Search......... 325/38 B, 62; 178/DIG. 3; 332/11 D; 179/15 AV

[56] References Cited

UNITED STATES PATENTS

| | | | |
|---|---|---|---|
| 3,491,206 | 1/1970 | Sheridan | 325/38 B |
| 3,628,148 | 12/1971 | Brolin | 325/38 B |
| 3,703,688 | 11/1972 | Flanagan | 332/11 D |
| 3,706,944 | 12/1972 | Tewksbury | 325/38 B |
| 3,757,252 | 9/1973 | Deschenes et al. | 325/38 B |

*Primary Examiner*—Robert L. Griffin
*Assistant Examiner*—Jin F. Ng

[57] ABSTRACT

An instantaneous adaptive delta modulation system including a modulator and a demodulator. The modulator comprises a comparator having a first input connected to receive an analog signal, a second input adapted for connection to an integrator located in the conventional feedback loop of the delta modulator, and a shift register connected to the output of the comparator and adapted to store the digits generated at the output of the comparator at sampling time $T_0$ and the digits generated at sampling times $T_{-1}$ and $T_{-2}$. A binary up and down counter is connected to the shift register through a control circuit which makes the decision as to whether an up count, a down count, or no count at all is required. The output of the counter is applied to a decoder for converting the binary outputs of the up and down counter into a number of outputs. An amplifier having a corresponding number of values of gain is connected to the outputs of the decoder and is thus responsive to the level of the up and down counter for providing a predetermined gain into the feedback loop of the delta modulator. The integrator is connected to the output of the amplifier and its output is connected to the comparator which compares the output signal of the integrator with the input analog signal and generates a signal depending upon the difference between the two signals. The demodulator is similar to the modulator except that the input signal is fed directly to the shift register and that the output of the integrator is fed to a low-pass filter.

5 Claims, 5 Drawing Figures

INSTANTANEOUS ADAPTATIVE DELTA MODULATION SYSTEM

This invention relates to an instantaneous adaptive delta modulation system including a modulator and a demodulator.

The delta modulation is a coding system used in communication to transform analog signals into digital signals for the transmission and reproduction of voice signals. It is characterized in that the pulses transmitted represent the variations of the amplitude of the analog signals and not their real amplitude. A delta modulation system is also characterized in that it is a closed loop system wherein the pulses generated at the output of the modulator are fed back to a local demodulator including an amplifier and an integrator connected to a comparator located at the input of the modulator. The output of the integrator is a signal made up of a series of steps which are compared to the input analog signal in the comparator to determine if the input analog signal has increased or decrease since the previous sampling time. When the amplitude of the steps generated by the amplifier is fixed, overload distortion or quantizing noise occurs depending on whether the size of the steps is too large or too small as compared to the variations in amplitude of the analog signal. In order to overcome such drawback, it has been customary to vary the size of the steps with the variations in amplitude of the analog signal. Such modulators are called adaptive or companded delta modulators. One type of adaptive delta modulator has been disclosed in U.S. Pat. No. 3,757,252. The present system however provides improved performances and greater simplicity.

The known adaptative delta modulators are of the syllabic type or of the instantaneous type. There are two types of syllabic adaptative modulator, namely the analog syllabic adaptative modulators and the digital syllabic adaptative modulators depending on whether the gain control signal of the amplifier is derived from the analog input signal or from the coded digital output signal. The gain control signal may be derived from the input analog signal using a simple envelope detector. Similarly, the gain control signal may be derived from the digital output by means of a syllabic filter. Such syllabic adaptative modulators will provide a continuous adaptation of the gain of the amplifier so as to vary the amplitude of the steps of the integrator accordingly.

The instantaneous adaptation or companding is derived from the digital output signal on a short time basis. The information derived is fed to a logic block which in turn controls the gain of the feedback loop in discrete steps.

The analog adaptative delta modulators have the following disadvantages:

1. in a delta modulation system including plural modulators, there may be a difference in the companding laws of the modulators due to manufacturing tolerances or to the drift of the analog elements, which will cause distortion;

2. in practice, a communication network which utilizes delta modulation systems will also have pulse code modulation systems. It would therefore be necessary to use delta modulation to pulse code modulation converters. One of the elements of such converters is a logic circuit which reproduces the companding law of the modulator. If such law is analog, the converter will only perform an approximative linear translation which will cause distortion.

The digital adaptative delta modulators do not have the above drawbacks. However, the ones developed until now are complicated and costly. A rather simple digital adaptative delta modulator has been disclosed in U.S. Pat. No. 3,757,252. However, such modulator has a certain amount of noise in the absence of signal. In addition, the choice of gains in the feedback loop is not optimal.

It is therefore the object of the present invention to provide an instantaneous adaptative delta modulation system which is an improvement over the system disclosed in the above patent application. The modulator comprises a comparator having a first input connected to receive an input analog signal and a second input adapted for connection to an integrator located in the conventional feedback loop of the delta modulator. The output of the comparator is an analog signal and is used as the input to the shift register. This shift register is a memory device with at least three stages; three stages are utilized in the present description. It has two functions; first, it samples through clock $H_1$, whose period is T, the sign of its input and stores a 1 if the input is positive and a 0 if the input is negative; the second function is to store three successive bits, the one generated at one sampling instant and two others generated at the two preceding sampling instants; these samplings times are referred to as $T_0$, $T_{-1}$, $T_{-2}$. A binary up and down counter is connected to the shift register through a control circuit which makes the decision as to whether an up count, a down count, or no count of the register is required depending on the digits stored in the shift register and on the actual state of the up and down counter. The output of the counter is applied to a decoder for converting the binary output of the up and down counter into a number of outputs. An amplifier having a corresponding number of values of gain is connected to the output of the decoder and is thus responsive to the level of the up and down counter for providing a predetermined gain in the feedback loop of the delta modulator. The integrator is connected to the output of the amplifier and its output is connected to the comparator which compares the output signal of the integrator with the input analog signal and generates a signal depending upon the difference between the two signals. The demodulator is identical to the modulator except that it does not have a comparator and that the input is fed directly to the shift register. In addition, the output of the integrator is fed to a low-pass filter.

The shift register has at least three memory units so as to permit storage of the digits generated at sampling times $T_0$, $T_{-1}$ and $T_{-2}$.

The control circuit comprises first gate means responsive to the presence of three identical digits in the shift register to feed an up count signal to the up and down counter, and to the presence of non-identical digits in the shift register to feed a down count signal to the up and down counter, and second gate means responsive to the lowest and highest state of the decoder for disabling the operation of the up and down counter when the lowest value of the decoder has been reached and that a down count signal is fed to the up and down counter, and when the highest value of the decoder has been reached and that an up count signal is fed to the up and down counter.

The invention will now be disclosed, by way of example, with reference to the accompanying drawings in which.

Figures 1, 4:
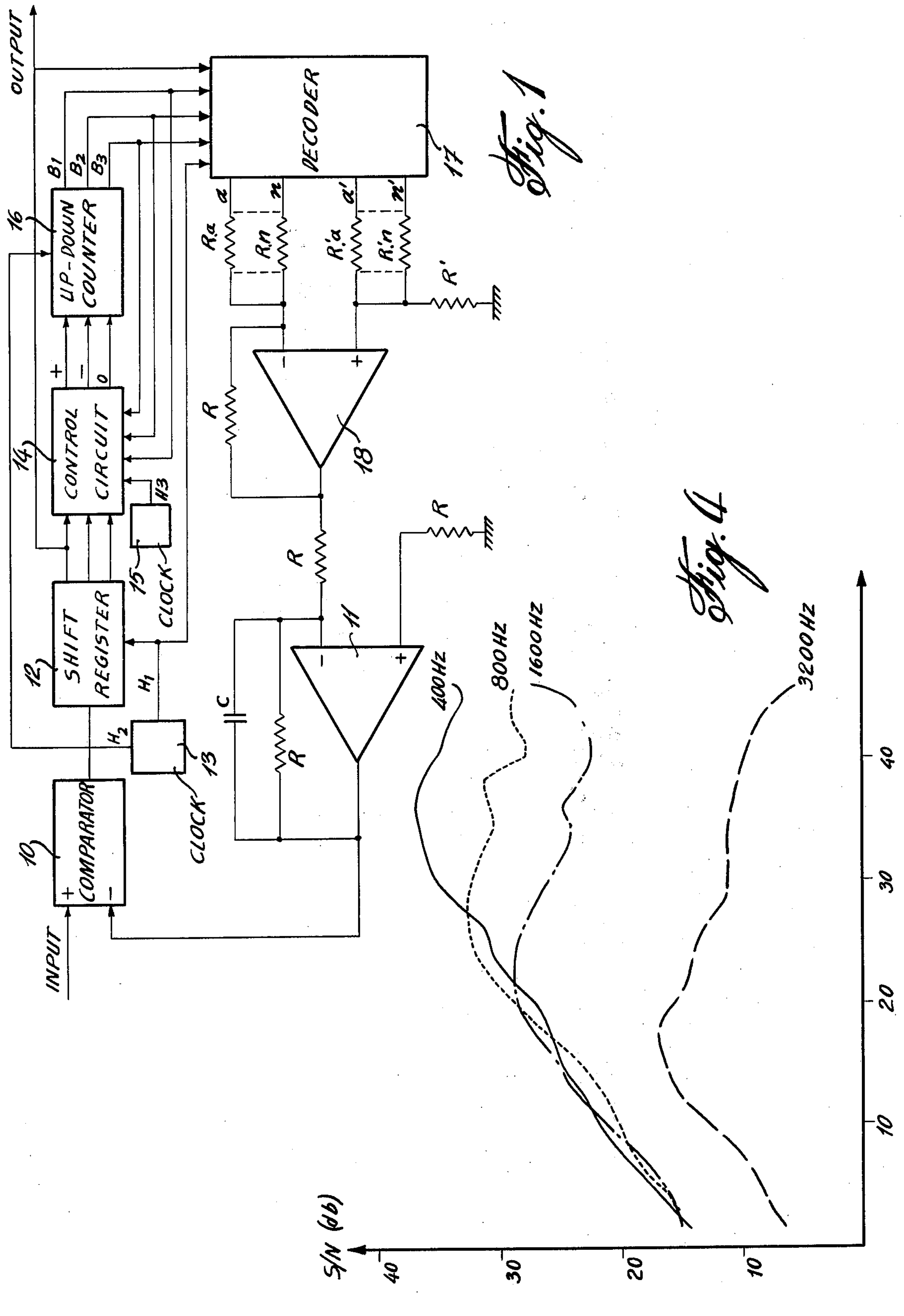
FIG. 1 illustrates a block diagram of a modulator in accordance with the invention.
FIGS. 4 and 5 illustrate signal to noise characteristics of the modulation system in accordance with the invention.

Referring to FIG. 1, there is shown an instantaneous adaptative delta modulator comprising a comparator 10 having a first input to which is applied an analog signal and a second input which is the output of an integrator 11 the function of which will be disclosed later. The output of the comparator 10 is applied to a shift register 12 which, on one hand, samples the output of the comparator and, on the other hand, memorizes the delta modulation digit being sent at sampling time $T_0$ as well as the two preceding digits corresponding to the two preceding sampling times $T_{-1}$ and $T_{-2}$. The shift register is of the conventional type and must include at least three memory units for storing the digits appearing at times $T_0$, $T_{-1}$ and $T_{-2}$. The shift register is controlled by the pulses $H_1$ of a clock 13.

The output of the shift register 12 is fed to a control circuit 14 which, under the control of a clock 15, controls the operation of an up and down counter 16 which itself is under the control of the pulses $H_2$ of clock 13. The structure of the control circuit will be disclosed later but let us mention now that the control circuit will, in the presence of three identical pulses, feed a signal + to the up and down counter to cause the counter to increase its count. If, on the other hand, the three digits stored into the shift register are not identical, the control circuit will feed a signal − to the counter to decrease the count thereof. If the counter is in its lowest or in its highest state, such will be detected by the control circuit and a signal 0 meaning no count is fed to the counter.

The binary outputs $B_1$, $B_2$ and $B_3$ of the up and down counter 16 are applied to a decoder 17 which, under the control of clock pulses $H_1$, will select one of a plurality of outputs designated as *a,b,c–n* and *a',b',c'–n'* and issue a voltage signal on such selected output. The polarity of the decoder output signal is derived from the output of the modulator and has a positive or negative value depending on whether a digit 1 or a digit 0 appears at the modulator output. Thus, if the decoder output signal is positive, it is applied on one of the outputs *a, b, c,–n*, whereas the negative signal is applied to one of the outputs *a', b', c'–n'*. Each of the decoder outputs is provided with a respective resistive element R*a*, R*b*–R*n* and R'*a*, R'*b*–R'*n* which are used to weigh the decoder output signal and thereby control the amplification value of an operational amplifier 18 which has a predetermined gain and which is located in the feedback loop of the delta modulator. Thus, the voltage value of the decoder output signal being fixed, each amplification value is determined by each of the resistive elements R*a*, R*b*–R*n* for the positive values of gain or R'*a*, R'*b*–R'*n* for the negative values of gain and the choice of amplification values is controlled by the level of the signal stored in the up and down counter as decoded by decoder 17. The output of operational amplifier 18 is fed to the integrator 11 which provides a step signal to be compared with the analog signal by the comparator 10. The integrator 11 may be a well-known operational amplifier equipped with its usual RC components.

The decoder 17 is a logic circuit of the type known in the art and preferably arranged to provide six outputs of positive polarity ($n$=6) and 6 outputs of negative polarity ($n$=6), such values of gain being calculated so as to obtain the best signal to noise ratio signals. The polarity of the gain is chosen as being the same as the preceding one when the three pulses appearing in the shift register are identical. If the pulses stored in the shift register are not identical, the polarity of the gain is positive when the digit corresponding to sampling time $T_0$ is 1, and negative when the digit corresponding to sampling time $T_0$ is 0.

Figure 2:
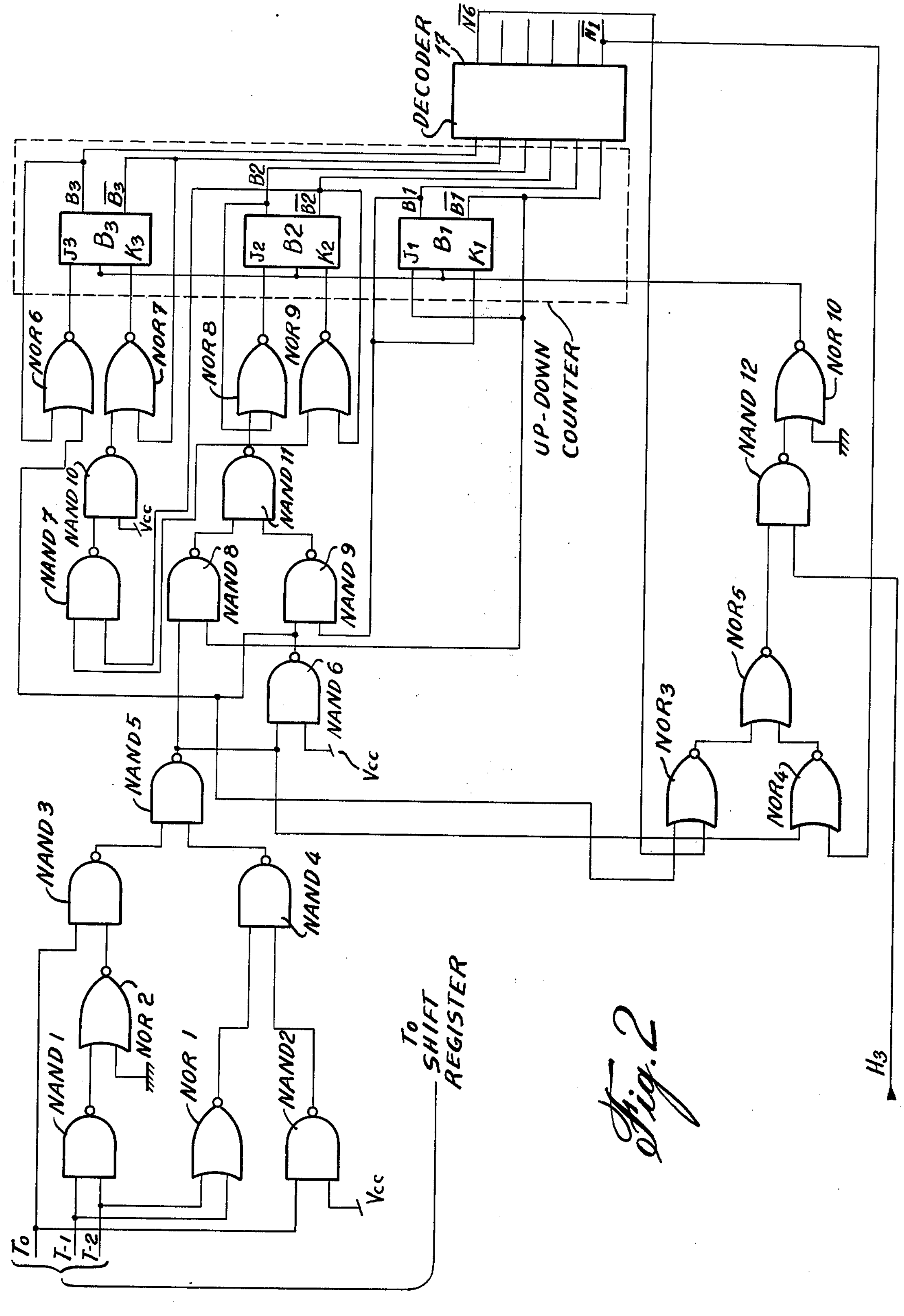
FIG. 2 illustrates the detailed circuit of the control circuit of FIG. 1.

FIG. 2 of the drawings illustrates the control circuit 14 in detail, a block diagram of the up and down counter, and a block diagram of the decoder 17. The up and down counter is made of three JK flip flops $B_3$, $B_2$, $B_1$, each having inputs J and K and outputs B and $\overline{B}$.

As to decoder 17, it is fed with the outputs B and $\overline{B}$ of each flip flop and has binary outputs $N_1$ to $N_6$ (not shown) and $\overline{N_1}$ to $\overline{N_6}$.

The control circuit comprises a series of NOR gates $NOR_1$ to $NOR_{10}$ and NAND gates $NAND_1$ to $NAND_{12}$ which are interconnected so as to provide suitable logic signals 1 or 0 to the inputs J or K of flip flops $B_1$ to $B_3$ of the up and down counter.

The description of the control circuit will be given with reference to four examples as follows:

a. A first case in which the state of the counter is $B_3B_2B_1 = 001$ and wherein the three digits stored in the shift register are $T = 0$, $T_{-1} = 0$, $T_{-2} = 1$. Such a condition requires a count down of the counter.

b. A second case in which a count down is given by the counter and in which the state of the counter $B_3B_2B_1$ equals 000.

c. A third case in which the state of the counter is $B_3B_2B_1 = 011$ and the digits stored into the shift register are $T_0 = 1$, $T_{-1} = 1$, $T_{-2} = 1$. Such a condition requires that the counter be stepped to 100.

d. A fourth case in which an up count signal is given by the control circuit but in which the counter has already reached its maximum value 110.

In the first case mentioned above, the appearance of digits 001 at the input of the control circuit will cause the output of the gates $NAND_1$ to $NAND_{11}$, $NOR_1$, $NOR_2$, and $NOR_6$ to $NOR_9$ to take the following values:

| | | | | |
|---|---|---|---|---|
| $NAND_1 = 1$ | $NAND_2 = 1$ | $NOR_1 = 0$ | $NOR_2 = 0$ | $NAND_3 = 1$ |
| $NAND_4 = 1$ | $NAND_5 = 0$ | $NAND_6 = 1$ | $NAND_7 = 0$ | $NAND_8 = 1$ |
| $NAND_9 = 0$ | $NAND_{10} = 1$ | $NAND_{11} = 1$ | $NOR_6 = 0$ | $NOR_7 = 0$ |
| $NOR_8 = 0$ | $NOR_9 = 0$ | | | |

Since the state of the counter is 001, the extreme decoder outputs $\overline{N_1}$ and $\overline{N_6}$ will be 1 and gates $NOR_3$ to $NOR_5$, $NAND_{12}$ and $NOR_{10}$ will take the following output values:

$NOR_3 = 0$ $NOR_4 = 0$ $NOR_5 = 1$ $NAND_{12} = \overline{H_3}$ $NOR_{10} = H_3$.

The clock pulses $H_3$ will therefore be fed to flip flops $B_1$ to $B_3$ and the inputs $J_1$ and $K_1$ of flip flop $B_1$ will both be 1. The flip flop will thus change state so that the state of the counter will become $B_3\ B_2\ B_1 = 000$.

If a count down is received and the state of counter is 000, the output $\overline{N_1}$ of the decoder is consequently 0 whereas the other output $\overline{N_1}$ is 1. Therefore, the outputs of gates $NOR_3$ to $NOR_5$, $NAND_{12}$ and $NOR_{10}$ will be as follows:

$NOR_3 = 0$ $NOR_4 = 1$ $NOR_5 = 0$ $NAND_{12} = 1$ $NOR_{10} = 0$.

Therefore, gates $NOR_3$ to $NOR_5$ will cause the output of gate $NAND_{12}$ to be permanently 1, thus blocking the clock pulse $H_3$ and providing a "no count" to the counter 16. Therefore, the couter does not move and a signal of minimum gain is provided by the decoder 17 to the amplifier 18.

Let us now assume that the signals stored in the shift register at sampling times $T_0$, $T_{-1}$, $T_{-2}$ are 1 1 1 thus calling for an up count of the counter and that the state of the counter is $B_3\ B_2\ B_1 = 011$. The outputs of gates $NAND_1$ to $NAND_{11}$, $NOR_1$, $NOR_2$ and $NOR_6$ to $NOR_9$ will be as follows:

| | | | | |
|---|---|---|---|---|
| $NAND_1 = 0$ | $NAND_2 = 0$ | $NOR_1 = 0$ | $NOR_2 = 1$ | $NAND_3 = 0$ |
| $NAND_4 = 1$ | $NAND_5 = 1$ | $NAND_6 = 0$ | $NAND_7 = 1$ | $NAND_8 = 1$ |
| $NAND_9 = 1$ | $NAND_{10} = 0$ | $NAND_{11} = 0$ | $NOR_6 = 1$ | $NOR_7 = 0$ |
| $NOR_8 = 0$ | $NOR_9 = 1$ | | | |

Since the outputs $\overline{N_1}$ and $\overline{N_6}$ of decoder 17 are both 1, the outputs of gates $NOR_3$ to $NOR_5$, $NAND_{12}$ and $NOR_{10}$ will be as follows:

The clock pulses will thus be applied to flip flops $B_3$, $B_2$ $B_1$ and change the state of flip flop $B_3$ to 1, $B_2$ to 0 and $B_1$ to 0.

If the state of flip flop $B_3$, $B_2$, $B_1$ had been 110, that is at the maximum value of decoder 17, and that an up count had been given, the output $\overline{N_6} = 0$ would have been fed to gate $NOR_3$. Consequently, the outputs of gates $NOR_3$ to $NOR_5$, $NAND_{12}$ and $NOR_{10}$ would have been as follows:

$NOR_3 = 0$ $NOR_4 = 0$ $NOR_5 = 1$ $NAND_{12} = \overline{H_3}$ $NOR_{10} = H_3$.

Consequently, as mentioned previously, the clock pulses would have been blocked and the counter would have remained in its state 110.

As commonly known, the demodulator located at the receiving end of a delta modulation system is identical to the local demodulator of the modulator located at the transmitting end of the system. Consequently, FIG. 3 of the drawings which shows the demodulator located at the receiving end of the line is identical to the diagram illustrated in FIG. 1 except that the comparator 10 does not exist and that a low-pass filter 20 is connected to the output of the integrator 21. The operation of the demodulator is idendical to the operation of the modulator. The input signal is fed to the shift register 22 and then fed to the counter 25 under the control of control circuit 23. The variable gain introduced into the modulator at the transmitting end is compensated for by the decoder 26 and amplifier 27 at the receiving end. The output of the amplifier 27 is then integrated by integrator 21 and filtered by low-pass filter 20 to reproduce an analog signal which is similar to the analog signal fed to the input of the comparator of FIG. 1.

FIG. 4 illustrates the signal to noise ratio vs amplitude obtained with the modulation system in accordance with the invention when different frequencies of 400, 800, 1600 and 3200 Hz are fed thereto. The sampling frequency was fixed for all the above signals at 56 Hz.

Figures 3, 5:
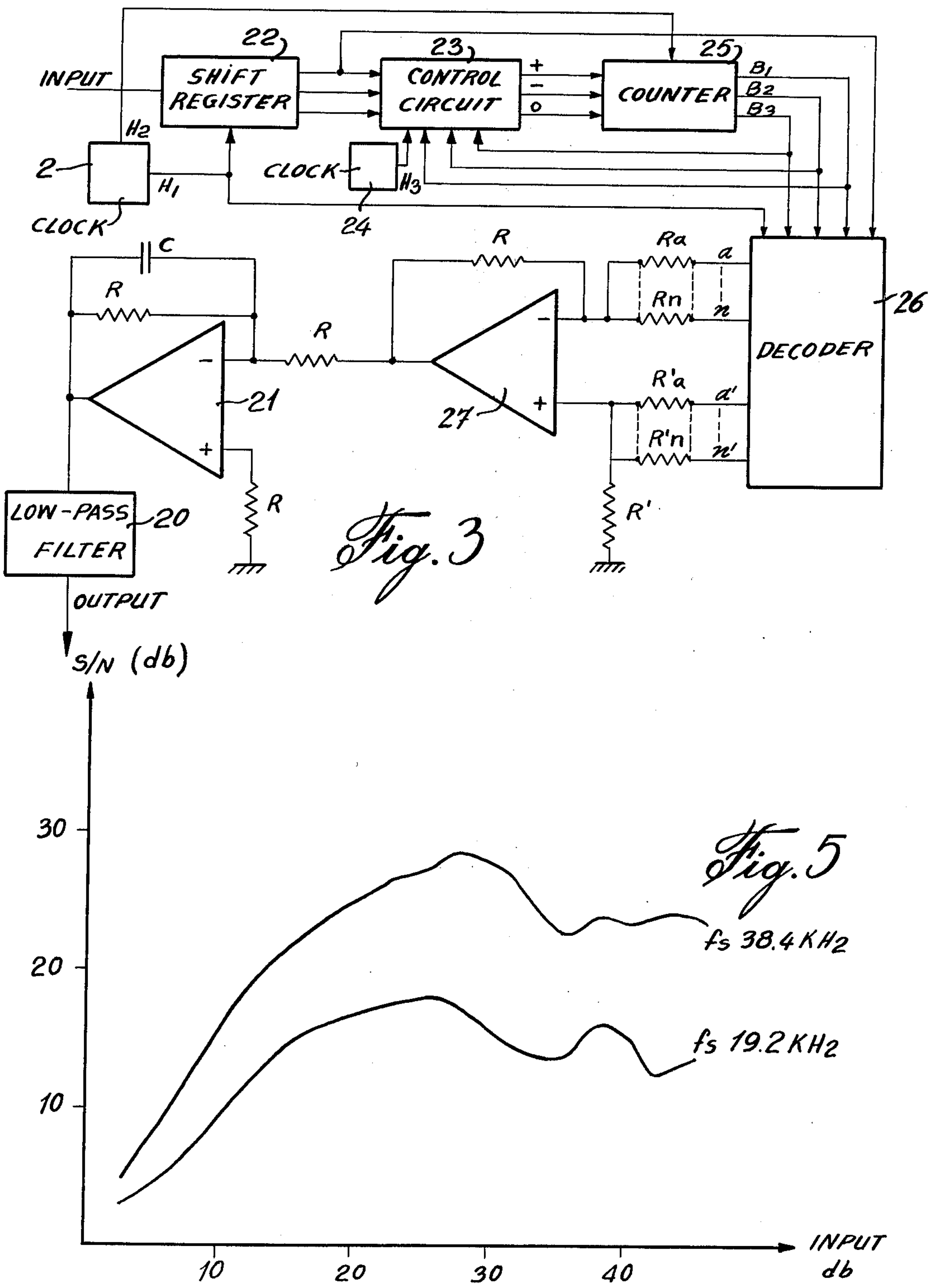
FIG. 3 illustrates a block diagram of the demodulator.

FIG. 5 illustrates the signal to noise ratio vs amplitude obtained for two sampling frequencies, one being 19.2 kHz and the other one being 38.4 kHz. The input signal was at a fixed frequency of 800 Hz.

Although the invention has been disclosed with reference to a preferred embodiment thereof, it is to be understood that various modifications may be made thereto without departing from the scope of the invention as defined in the following claims.

We claim:

1. An instantaneous adaptative delta modulator comprising:

a. a comparator having a first and a second input and a single output, said first input being connected to receive an input analog signal;

b. a shift register connected to the output of said comparator for storing the digit generated at sampling time $T_0$ and the digits generated at sampling times $T_{-1}$ and $T_{-2}$;

c. a binary up and down counter;

d. a control circuit interconnecting said shift register and said up and down counter, said control circuit comprising first gate means and second gate means responsive to a combination of the digits generated at sampling times $T_0$, $T_{-1}$ and $T_{-2}$ for making the decision as to whether an up count, a down count, or no count is required depending on the digits stored into the shift register and on the actual state of the up and down counter;

e. a logic circuit having a plurality of outputs for selecting and producing a signal on one of said outputs in response to the binary output of said up and down counter, all of said outputs except the selected one being open-circuited;

f. a plurality of resistive elements, each being connected to one output of said plurality of outputs of said logic circuit, said elements weighing the logic circuit output signal;

g. an amplifier connected in series with said plurality of resistive elements and thus responsive to said up and down counter for providing a predetermined gain corresponding to the logic output signal weighed by the selected resistive element;

h. an integrator connected to said amplifier and having an output connected to said second input of the comparator; whereby said comparator compares the output signal of said integrator with the input analog signal and generates a signal depending on the difference between the two input signals.

2. A modulator as defined in claim 1, wherein said shift register has at least three memory units so as to permit storage of the digits generated at times $T_0$, $T_{-1}$ and $T_{-2}$.

3. A modulator as defined in claim 1, wherein said first gate means is responsive to the presence of three identical digits in the shift register to feed an up count signal to the up and down counter, and to the presence of non-identical digits in the shift register to feed a down count signal to the up and down counter, and said second gate means is responsive to the lowest and highest state of said logic circuit for disabling the operation of the up and down counter when the lowest value of the logic circuit has been reached and that a down count signal is fed to the up and down counter, and when the highest value of the logic circuit has been reached and that an up count signal is fed to the up and down counter.

4. A modulator as defined in claim 1, wherein the number of outputs of said logic circuit is six of two different polarities thus permitting to said amplifier to have six different values of gain and their corresponding polarities.

5. A modulator as defined in claim 4, wherein the number of gains $n$ is different from 6, namely $n \geq 4$.

* * * * *